(12) United States Patent
Sofinski et al.

(10) Patent No.: US 9,494,440 B2
(45) Date of Patent: Nov. 15, 2016

(54) GENERATING TRAVEL ROUTES FOR INCREASED VISUAL INTEREST

(71) Applicant: Strol, LLC, Los Altos, CA (US)

(72) Inventors: Serguei Sofinski, Los Altos, CA (US); Dmitry Chistyakov, Sunnyvale, CA (US); Irina Shamkova, New York, NY (US)

(73) Assignee: Strol, LLC, Los Altos, CA (US)

( * ) Notice: Subject to any disclaimer, the term of this patent is extended or adjusted under 35 U.S.C. 154(b) by 0 days.

(21) Appl. No.: 14/319,649

(22) Filed: Jun. 30, 2014

(65) Prior Publication Data

US 2015/0377639 A1    Dec. 31, 2015

(51) Int. Cl.
*G01C 21/34*    (2006.01)
(52) U.S. Cl.
CPC .................. *G01C 21/343* (2013.01)
(58) Field of Classification Search
CPC .. G01C 21/02; G01C 21/26; G01C 21/3453; G01C 21/3476; G01C 21/3641; G01C 21/3688; G08G 1/096716
USPC ............... 701/410, 411, 533, 537, 439, 468; 709/203, 205, 217; 715/740
See application file for complete search history.

(56) References Cited

U.S. PATENT DOCUMENTS

| 8,532,927 | B2 | 9/2013 | Joshi | |
| 8,977,632 | B2 * | 3/2015 | Xiao | G06F 17/30241 |
| | | | | 707/750 |
| 9,014,726 | B1 * | 4/2015 | Foster | H04W 4/02 |
| | | | | 455/418 |
| 2007/0078596 | A1 | 4/2007 | Grace | |
| 2009/0204892 | A1 | 8/2009 | Cheung | |
| 2009/0210142 | A1 | 8/2009 | Couckuyt | |
| 2010/0121566 | A1 * | 5/2010 | Joshi | G01C 21/3461 |
| | | | | 701/533 |
| 2010/0305842 | A1 * | 12/2010 | Feng | G06F 17/3087 |
| | | | | 701/533 |

(Continued)

FOREIGN PATENT DOCUMENTS

| CN | 103245349 | 8/2013 |
| KR | 100864176 B1 | 10/2008 |

(Continued)

OTHER PUBLICATIONS

Bing Maps—Driving Directions, Traffic and Road Conditions, Bing.com, © 2015 Microsoft, Retrieved on Dec. 17, 2015, 3 pages. Available at: http://www.bing.com/maps/.

(Continued)

*Primary Examiner* — Marthe Marc-Coleman
(74) *Attorney, Agent, or Firm* — Robert Plotkin, P.C.; Robert Plotkin, Esq.

(57) ABSTRACT

A computer system identifies data representing interest of users in a plurality of geographic sites, such as images of geographic sites submitted by people to public photo sharing sites. The system generates a "heat map" representing densities of the interest data. The system generates a route from a starting location to an ending location. The route includes at least one of the plurality of geographic sites, even if the route is not the maximally efficient route from the starting location to the ending location (measured, e.g., in terms of the total time required to travel the route or the total distance of the route). The system favors high-temperature sites for inclusion in the route, but ensures that the route does not deviate too far from the route having the shortest possible distance between the starting location and the ending location at the expense of including high-temperature sites.

24 Claims, 4 Drawing Sheets

(56) References Cited

U.S. PATENT DOCUMENTS

| | | | | |
|---|---|---|---|---|
| 2011/0078139 A1* | 3/2011 | Xiao | ............... | G06F 17/30241 707/724 |
| 2012/0185163 A1 | 7/2012 | Boschker | | |
| 2013/0006521 A1 | 1/2013 | Needham | | |
| 2013/0173151 A1 | 7/2013 | Freeman | | |
| 2013/0332068 A1 | 12/2013 | Kesar | | |
| 2014/0280318 A1* | 9/2014 | Simms | ............. | G06F 17/30241 707/769 |

FOREIGN PATENT DOCUMENTS

| | | |
|---|---|---|
| KR | 1020090071076 A | 7/2009 |
| KR | 101061362 B1 | 9/2011 |

OTHER PUBLICATIONS

Boehret, Katherine, "Oh, the Places Your Phone Will Find. Field trip Sends Tidbits About Sometimes-Hidden Locations as You Pass," Review of Field Trip App—WSJ.com, Dec. 13, 2013, 3 pages. Available at: https://web.archive.org/web/20131211005518/http://online.wsj.com/news/articles/SB10001424052702304854804579236194222404898.
Bremner, Caroline, "Top 150 City Destinations: London Leads the Way," Oct. 11, 2007, Euromonitor International: News and Resources: Top 150 City Destinations Ranking—2006 Data, 8 pages. Available at: http://blog.euromonitor.com/2007/10/top-150-city-destinations-london-leads-the-way.html.
Bremner, Caroline, "Top 150 City Destinations: London Leads the Way," Oct. 11, 2007, Euromonitor International: News and Resources: Top 150 City Destinations Ranking—2006 Data, Availabie at: http://blog.euromonitor.com/2007/10/top-150-city-destinations-london-leads-the-way.html, 8 pages.
Burns, Chris, "Field Tap: the Google map app you never knew you wanted," SlashGear.com, Jan. 20, 2015, 6 pages. Available at: http://www.slashgear.com/field-trip-the-google-map-app-you-never-knew-you-wanted-20365399/.
Chan, Casey, "How to Save Offline Maps in the New Google Maps for iOS," Jul. 17, 2013, Gizmodo.com. Filed to: TIPS, 1 page. Available at: http://gizmodo.com/how-to-save-offline-maps-in-the-new-google-maps-for-ios-819672562.
Download and use offline areas—Maps for mobile Help, Android: Maps version 9, Google Maps, © 2015 Google, Retrieved on: Dec. 20, 2015, 5 pages. Available at: https://support.google.com/gmm/answer/6291838?hl=en&rd=2.
Duffy, Jill, "Top 5: Travel Guide Apps for iPhone," AppScout: PCMag.com, Apr. 8, 2013, 2 pages. Available at: http://appscout.pcmag.com/apple-ios-iphone-ipad-ipod/309840-top-5-travel-guide-apps-for-iphone.
Fodor's Travel Mobile Apps Fodor's Travel Guides, Fodor's Travel Mobile Apps: City Guides, Fodors.com, Copyright © 2015 by Fodor's Travel, a division of Penguin Random House LLC, Retrieved on: Dec. 19, 2015, 2 pages. Available at: http://www.fodors.com/mobile-apps/.
Gogobot—The go-to place for places to go, Gogobot.com Homepage, © 2016 Gogobot Inc., Retrieved on: Dec. 17, 2015, 8 pages. Available at: http://www.gogobot.com/.
HearPlanet iPhone HearPlanet.com, © 2012 HearPlanet, Inc., Retrieved on: Dec. 17, 2015, 5 pages. Available at: http://www.hearplanet.com/.

iOS 9—Maps—Apple, Copyright © 2015 Apple Inc., Retrieved on Dec. 17, 2015, 6 pages. Available at: http://www.apple.com/ios/maps/.
Know What A city and travel guide for the iPhone, Knowwhatapp.com, © 2012-2014 Escape Apps, LLC, Retrieved on: Dec. 20, 2015, 5 pages. Available at: https://web.archive.org/web/20140703090117/http://knowwhatapp.com/.
Koetsier, John, "Yahoo! TimeTraveler: a travel app whose time has come," VentureBeat.com, May 24, 2012. 2 pages. Available at: http://www.venturebeat.com/2012/05/24/yahoo-timetraveler-a-travel-app-whose-time-has-come/.
MapQuest Maps—Driving Directions—Map, © 2015 MapQuest, Inc., Retrieved on Dec. 17, 2015, 10 pages. Available at: http://www.mapquest.com.
Panoramio—Photos of the World, Panoramio.com, Retrieved on: Dec. 17, 2015, 1 page. Available at: http://www.panoramio.com.
Paul, Sonia, "Frommer's Interactive Travel Guides Available for iPhone and iPad," Mashable.com, May 1, 2012, 4 pages. Available at: http://mashable.com/2012/05/01/frommer-travel-guides/#ITbmCZKhTgq1.
Shawl, Brandy, "Travel Channel Cities updated with four new cities to help mobile travelers," Adweek: Social Times: Apps, Dec. 6, 2013, 4 pages. Available at: http://www.adweek.com/socialtimes/travel-channel-cities-updated-with-four-new-cities-to-help-mobile-travelers/544994.
The.Travel is the future of the travel panning!, © 2014 The Travel., Retrieved on: Dec. 23, 2015, 1 page. Available at: http://www.the.travel/Main.
Tour Guide App—Audio Travel Guides Application & Tourist Apps, Tourpal.com Homepage, Retrieved on: Dec. 19, 2015, 2 pages. Available at: http://www.tourpal.com/.
TouristEye—Travel Guide—Android Apps on Google Play, Google Play, © 2015 Google, Retrieved on: Dec. 20, 2015, 1 page. Available at: https://play.google.com/store/apps/details?id=com.touristeye&hl=en.
Travel Guides for iPhone, iPod Touch & Android mTrip Travel Guides, © 2011 mTrip—Travel Guides for Android, iPhone, iPad & iPod Touch, Retrieved on: Dec. 19, 2015, 4 pages. Available at: https://web.archive.org/web/20150202125206/http://www.mtrip.com/.
Triposo, Triposo.com Homepage, Retrieved on: Dec. 17, 2015, 7 pages. Available at www.triposo.com.
Vasenev, Eugene, Livejournal.com Web Blog, Feb. 26, 2014, © LiveJournal, Retrieved on: Dec. 23, 2015, 15 pages. Available at: http://evgenyvasenev.livejournal.com/373449.html.
World Travel Guide by Triposo—Android Apps on Google Play, Google Play, © 2015 Google, Retrieved on: Dec. 20, 2015, 6 pages. Available at: https://play.google.com/store/apps/details?id=com.triposo.droidguide.world&hl=en.
Yahoo! launches TimeTraveler for people on the go, SCALEOLOGY, May 25, 2012, 3 pages. Available at: https://web.archive.org/web/20121031090139/http://scaleogy.com/yahoo-launches-timetraveler-for-people-on-the-go.
Yahoo! Maps, © 2015 Yahoo! Inc., Retrieved on Dec. 17, 2015, 2 pages. Available at: https://web.archive.org/web/20150624053215/https://maps.yahoo.com/.
Yahoo TimeTraveler App Now in the App Store, Webpronews.com, May 24, 2012. 7 pages. Available at: http://www.webpronews.com/yahoo-time-traveler-app-2012-05/.

* cited by examiner

GENERATING TRAVEL ROUTES FOR INCREASED VISUAL INTEREST

BACKGROUND

When tourists visit a new city with which they are not familiar, they often rely on a computer mapping application (such as Google Maps, MapQuest, or Apple Maps) to guide them on a route from their current location to a desired destination (e.g., the Eiffel Tower in Paris). Such mapping applications typically calculate and display to the user the most efficient route from the user's current location to the desired destination, where efficiency may be measured in terms of travel time or distance. Such mapping applications also typically are capable of calculating and displaying different routes which are optimized for the user's mode of travel, such as automobile, public transit, or by foot. Tourists, however, are not always interested in traveling from one point to another by the most efficient route. Consequently, in addition to maps, tourists traveling on their own have to do extensive research using other materials such as travel books and press articles to identify places, areas, or stretches of streets that are interesting to see. As a result, tourists have to manually adjust or deviate from map-generated routes in order to visit these places of interest.

SUMMARY

A computer system identifies data representing interest of users in a plurality of geographic sites, such as images of geographic sites submitted by users to public photo sharing sites. The system generates a "heat map" representing densities of the user interest data. The system generates a route from a starting location to an ending location. The route includes at least one of the plurality of geographic sites, even if the route is not the maximally efficient route from the starting location to the ending location (measured, e.g., in terms of the total time required to travel the route or the total distance of the route). The system favors high-temperature sites for inclusion in the route, but ensures that the route does not deviate too far from the route having the shortest possible distance between the starting location and the ending location at the expense of including high-temperature sites.

For example, one embodiment of the present invention is directed to a computer-implemented method and/or system which performs acts of: (1) receiving a plurality of geographic location data representing geographic locations of a plurality of geographic sites, wherein each of the geographic locations is a geographic location of a corresponding one of the plurality of geographic sites; (2) generating, based on the plurality of geographic location data, heat map data containing a plurality of cells representing a plurality of densities of the geographic locations in a plurality of geographic areas; (3) generating, based on the heat map data, initial route data representing an initial route from a starting location to an ending location, wherein the initial route includes a plurality of intermediate locations selected from the geographic locations of the plurality of geographic sites; and (4) modifying the initial route to produce a modified route, comprising: (4)(a) removing, from the initial route data, at least one of the plurality of intermediate locations based on at least one optimization criterion.

Other features and advantages of various aspects and embodiments of the present invention will become apparent from the following description and from the claims.

DETAILED DESCRIPTION

As described above, existing computer mapping applications (such as Google Maps, MapQuest, or Apple Maps) typically calculate and display to the user the most efficient route from the user's current location to the desired destination, where efficiency may be measured in terms of travel time and/or distance. Users—such as a tourist visiting a new city—are not always interested in traveling from one point to another by the most efficient route. For example, a tourist who desires to travel to a particular destination may be willing to travel to that destination via a route that is less than maximally efficient if such a route takes the user past intermediate destinations that are visually interesting, such as historic sites or architectural landmarks, and locations identified by additional criteria set by users, such as restaurants, museums, stores, and historic sites. Such a tourist, in other words, is not necessarily interested in reaching the desired final destination as quickly as possible or in the shortest distance possible, but rather in seeing and otherwise visiting as many interesting intermediate destinations as possible along the way to the desired final destination. The maximally efficient routes generated and displayed to users by conventional computer mapping applications often omit such visually interesting intermediate destinations.

In contrast, embodiments of the present invention generate routes between a starting location and an ending location which include interesting intermediate destinations, even if including such interesting intermediate destinations increases the total time and/or distance of the route in comparison to a maximally efficient route. As a result, embodiments of the present invention may be used to generate, and present to users, routes which satisfy the users' goals more effectively than traditional computer mapping applications.

Embodiments of the present invention take into account the fact that although users are willing to traverse a route that is less than maximally efficient in order to visit interesting intermediate destinations, users typically are not interested in deviating too far from a maximally efficient route in order to visit interesting intermediate destinations along the way. In response to this constraint, embodiments of the present invention impose limits on the extent to which a generated route may deviate from a maximally efficient route (where such a maximum deviation may be measured, e.g., in terms of a maximum time and/or distance) in order to include an interesting intermediate destination. For example, if adding an interesting intermediate destination would cause a route generated by embodiments of the present invention to deviate too far from a maximally efficient route, embodiments of the present invention omit that interesting intermediate destination from the route, in order to avoid imposing too much of a burden (measured, e.g., in terms of additional travel time and/or distance) on the user.

As described above, embodiments of the present invention add interesting (e.g., visually interesting) intermediate destinations to routes between a starting location (e.g., the user's current location) and an ending location (e.g., the user's desired destination). Embodiments of the present invention may determine whether, and the extent to which, any particular location is "interesting" in a variety of ways. For example, embodiments of the present invention may identify input, provided by one or more people, related to a particular destination. Examples of such input include images of the particular destination posted by one or more people to the Internet (e.g., to Panoramio, Facebook, Flickr, Tumblr, or Instagram). Embodiments of the present invention may interpret the actions of posting such photos as evidence that the people who posted those images consider the locations represented by the images to be interesting. For example, tourists who visit a new city often post photos of locations visited during their trip on online photo sites to indicate that the locations represented by the photos are interesting to those tourists. Each such photo may, for example, be treated by embodiments of the present invention as a vote, by the person who posted the photo, that the photo represents an interesting location. Embodiments of the present invention may aggregate such votes (such as multiple votes for a particular location and votes for multiple locations) and apply any function to such votes to generate a score or other measure of interest in the location represented by the photo. Embodiments of the present invention may do the same for any number of photos (and to other forms of content or other input received from people). Embodiments of the present invention may then use the measures of interest of photos to identify interesting locations, and to insert such interesting locations into routes generated for users traveling from one location to another.

More specifically, embodiments of the present invention divide a geographic area (such as a country, state, city, town, or neighborhood) into a grid consisting of cells (e.g., of 100×100 meters each), and then count the number of available photos within each cell. Embodiments of the present invention create a "heat map" based on the density of photos within the grid. For example, a cell (or collection of contiguous cells) containing a relatively large number of photos may be assigned a higher ("hotter") value than a cell (or collection of contiguous cells) containing a relatively small number of photos.

When a user indicates that he or she wishes to travel from a starting location (e.g., the user's current location) to an ending location, embodiments of the present invention generate an initial route between the starting location and the ending location. The initial route includes waypoints representing relatively "hot" locations (e.g., locations associated with high densities of photos). Embodiments of the present invention then remove, from the initial route, waypoints which cause the initial route to deviate too far (measured, e.g., in terms of time and/or distance) from the maximally efficient route between the starting location and the ending location.

Figure 1A:
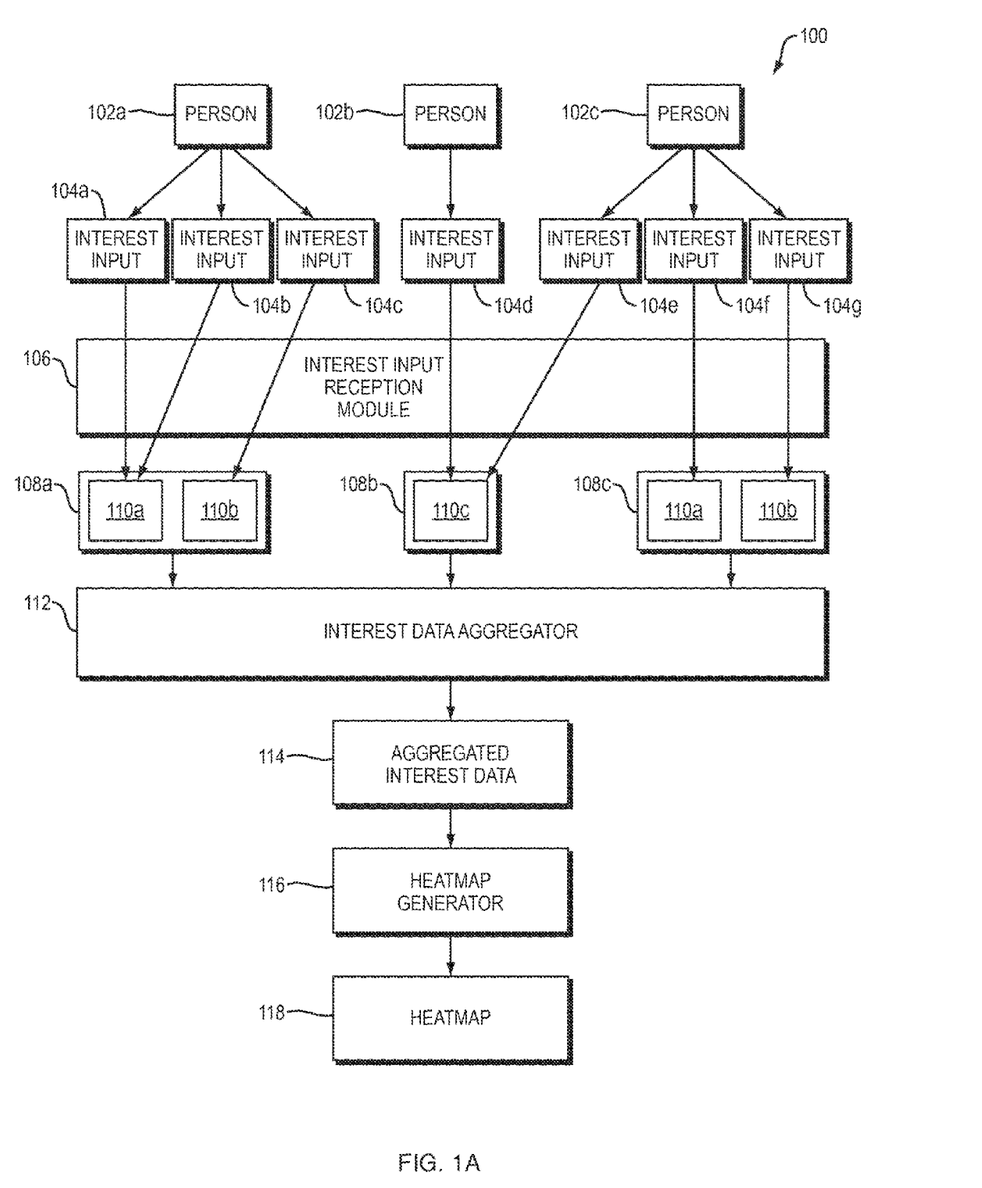
FIG. 1A is a dataflow diagram of a system for generating a visual interest heat map based on a plurality of inputs received from people according to one embodiment of the present invention.

Having described certain embodiments of the present invention in general terms, particular embodiments of the present invention will now be described in more detail. Referring to FIG. 1A, a dataflow diagram is shown of a system 100 for generating an interesting route from a starting location to an ending location according to one embodiment of the present invention. Referring to FIG. 2, a flowchart is shown of a method 200 performed by the system 100 of FIG. 1A and the system 150 of FIG. 1B according to one embodiment of the present invention.

A plurality of people 102$a$-$c$ may use the system 100. Although three people 102$a$-$c$ are shown in FIG. 1A, this is merely an example; any number of people may use the system 100. Furthermore, although the people 102$a$-$c$ may use any device(s) of any type, in any combination (such as digital cameras, smartphones, tablet computers, desktop computers, and laptop computers), to perform the functions disclosed herein, such devices are omitted from FIG. 1A and from the description herein for ease of illustration and explanation. Such devices may communicate over the Internet and/or any other network to perform functions disclosed herein.

The people 102$a$-$c$ may provide inputs 104$a$-$g$ to the system 100, such as by using the devices described above. In the particular example shown in FIG. 1, person 102$a$ provides inputs 104$a$-$c$ to the system 100, person 102$b$ provides input 104$d$ to the system 100, and person 102$c$ provides inputs 104$e$-$g$ to the system 100. This particular set of inputs 104$a$-$g$ is shown merely as an example and does not constitute a limitation of the present invention. People 102$a$-$c$ may provide any inputs, of any number in any combination, to the system 100. The system 100 receives the inputs 104$a$-$g$ (FIG. 2, operation 202).

As will be described in more detail below in connection with FIG. 1B, the people 102$a$-$c$ shown in FIG. 1A may or may not be users of the system 150 of FIG. 1B, which is used to generate routes from one location to another. The people 102$a$-$c$ shown in FIG. 1A may provide inputs 104$a$-$g$, which the system 100 of FIG. 1A may use to generate a heat map 118. The system 150 of FIG. 1B may then use that heat map 118 to generate a route 126 for a user 130 of the system 150 of FIG. 1B. The user 130 of FIG. 1B may or may not be one of the people 102$a$-$c$ who provided the inputs 104$a$-$g$ to the system 100 of FIG. 1A.

The inputs 104$a$-$g$ are referred to herein as "interest inputs" (or as "interest input data") because, as will be described in more detail below, the system 100 interprets some or all of the inputs 104$a$-$g$, in whole or in part, as evidence that the people 102$a$-$c$ find content represented by (or otherwise corresponding to) the inputs 104$a$-$g$ to be interesting. For example, the system 100 may interpret input 104$a$, received by the system 100 from person 102$a$, as evidence that person 102$a$ finds content represented by (or otherwise corresponding to) the input 104$a$ to be interesting. As a particular example, if the person 102$a$ is a tourist visiting Paris, the input 104$a$ may be a digital image of the Eiffel Tower captured and submitted by the person 102$a$ to the system 100 using a smartphone, in which case the system 100 may interpret the input 104$a$ as evidence that the person 102$a$ who provided the input 104$a$ to the system 100 finds the Eiffel Tower to be interesting.

The interest input data 104$a$-$g$ may take any of a variety of forms. For example, the interest input data 104$a$-$g$ may include, in any number and combination:
  images, such as images of geographic sites (e.g., buildings, campuses, rooms, roads, parks, outdoor facilities, monuments, and natural features (such as mountains, oceans, rivers, and fields));
  image, video, audio, and/or text data describing geographic sites of any of the kinds described above; and
  data (such as image, video, audio, and/or text data) representing:
    preferences for (e.g., opinions of) geographic sites of any of the kinds described above;

preferences for (e.g., opinions of) images, text, and/or other content describing and/or expressing preferences for geographic sites of any of the kinds described above.

Interest input data representing a user's preference for a geographic site may take any of a variety of forms, such as:
input (such as input provided by the user to the system 100) specifying a binary preference of the user for the geographic site, such as input by the user to "like" the geographic site (or content representing or otherwise related to the geographic site, such as a web site related to the geographic site) on Facebook or another online application;
input (such as input provided by the user to the system 100) representing a description by the user of the geographic site, such as a textual or video review of the geographic site;
input (such as input provided by the user to the system 100) indicating that the user has checked in at, or otherwise visited the geographic site, such as data provided to and/or obtained from FourSquare indicating that the user has checked in at the geographic site;
input (such as input provided by the user to the system 100) representing the geographic site, such as an image, video, audio, or text representing the geographic site.

As the examples above illustrate, a particular interest input provided by a user may explicitly indicate that the user finds a geographic site associated with (e.g., represented by) the particular interest input to be interesting, as in the case of a video review by the user of a restaurant in which the user expresses a positive opinion of the restaurant. In other cases, a particular interest input may not explicitly indicate that the user finds a geographic site associated with (e.g., represented by) the particular interest input to be interesting, as in the case of one of many photos posted by a user to Flickr while traveling through Paris. In the latter case, and as described in more detail below, the system 100 may infer that the user's act of posting a particular photo to Flickr (or otherwise providing, directly or indirectly, the interest input to the system 100) implies that the user is interested in the geographic site represented by or otherwise associated with the interest input. The interest inputs 104a-g received by the system 100 may include both interest inputs which do and do not explicitly indicate the user's interest in corresponding geographic sites.

The system 100 includes one or more interest input reception modules 106, which receive the interest inputs 104a-g from the people 102a-c. The interest input reception module 106 will be referred to in the singular herein, even though the interest input reception module 106 may be implemented using multiple such modules. For example, the interest input reception module 106 may be implemented, in whole or in part, by multiple Internet applications, such as one or more of Panoramio, Facebook, Flickr, Tumblr, and Instagram, each of which is capable of receiving digital images and other forms of interest input from people 102a-c. Additionally or alternatively, the interest input reception module 106 may include one or more components for receiving some or all of the interest input 104a-g directly from people 102a-c.

As shown in FIG. 1A, the interest input reception module 106 may generate and/or maintain one or more stores 108a-c of data based on the interest inputs 104a-g. For example, the stores 108a-c may be collections of images (e.g., photos), text, audio, and/or video. As a particular example, data store 108a may be a store of data generated and maintained by a first application (e.g., Facebook), data store 108b may be a store of data generated and maintained by a second application (e.g., Panoramio), and data store 108c may be a store of data generated and maintained by a third application (e.g., Flickr).

In the particular example shown in FIG. 1, the interest input module 106:
receives interest input 104a from person 102a, generates interest data record 110a based on interest input 104a, and stores data record 110a in data store 108a;
receives interest input 104b from person 102a and modifies interest data record 110a in data store 108a based on interest input 104b;
receives interest input 104c from person 102a, generates interest data record 110b based on interest input 104c, and stores data record 110b in data store 108a;
receives interest input 104d from person 102b, generates interest data record 110c based on interest input 104d, and stores data record 110c in data store 108b;
receives interest input 104e from person 102c and modifies interest data record 110c based on interest input 104e;
receives interest input 104f from person 102c, generates interest data record 110d based on interest input 104f, and stores data record 110d in data store 108c; and
receives interest input 104g from person 102c, generates interest data record 110e based on interest input 104g, and stores data record 110e in data store 108c.

As the examples described above illustrate:
each of the people 102a-c may provide any number of interest inputs to the interest input reception module 106, which may use such inputs to generate and/or modify any number of interest data records in any number of data stores;
a single user may provide interest inputs which the interest input reception module 106 uses to generate and/or modify interest data records in one or more data stores; and
a single data store may include interest data records which were generated and/or modified based on interest inputs received from one or more users.

The interest input reception module 106 may "modify" interest data records 110a-e in any of a variety of ways, such as by adding data to, removing data from, or modifying data within interest data records 110a-e.

Each of the interest data records 110a-e may include its own geographic site data representing a corresponding geographic site. For example, interest data record 110a may include geographic site data (e.g., an image) representing a first geographic site (e.g., the Eiffel Tower), while interest data record 110b may include geographic site data (e.g., an image) representing a second geographic site (e.g., the Louvre). As a result, the interest data records 110a-e may collectively represent a plurality of geographic sites. Any two of the interest data records may represent distinct geographic sites (e.g., the Eiffel Tower and the Louvre) or the same geographic site (e.g., the Eiffel Tower). An interest data record may "represent" a corresponding geographic site in any of a variety of ways, such as in the form of image, text, audio, and/or video data representing the corresponding geographic site. An interest data record may represent a single geographic site or multiple geographic sites (as in the case of an image representing both a building and a river).

An interest data record may include data representing a preference of a user for a geographic site represented by the interest data record. For example, an interest data record in the form of an image of the Eiffel Tower may include data representing a preference of a user for the Eiffel Tower. Such a preference may take any of a variety of forms, such as a binary "like" or "does not like" value, a value selected from a scale (e.g., a value of five selected from a scale of one through ten), or a label. A single interest data record may include data representing preferences of a plurality of users for a single geographic site represented by the interest data record. Since each of the interest data records 110a-e may include such preference data, the interest data records 110a-e may include preference data representing a plurality of preferences, of a plurality of users, for a plurality of geographic sites represented by the interest data records 110a-e.

Such preference data may, but need not, be stored within the interest data records 110a-e themselves. For example, if the interest data records 110a-e include images stored on Facebook, then the preference data may include Facebook "likes" for those images, where such preference data may be stored outside of the images, and yet include links to the corresponding images. More generally, any data disclosed herein as being contained within other data may alternatively be stored separately from the other data, with a pointer or other association between the two being stored to enable the relationship between the two to be retained and retrieved.

As a particular example, if the person 102b provides interest input 104d to provide a image of the Eiffel Tower to the interest input reception module 106, resulting in the creation of interest data record 110c representing the image of the image of the Eiffel Tower, and the person 102c provides interest input 104e representing a Facebook "like" of the image of the Eiffel Tower represented by the interest data record 110c, then the interest input reception module 106 may "modify" the interest data record 110c to reflect the Facebook "like" of the person 102c by storing data representing the Facebook "like" of the person 102c, whether by modifying data contained within the interest data record 110c, or by storing data representing the Facebook "like" outside of the interest data record 110c but in association with the interest data record 110c in a manner which enables the association of the Eiffel Tower image and the Facebook "like" to be retrieved subsequently.

One or more of the interest data records 110a-e may include geolocation data (also referred to herein as "geographic location data") representing geographic locations. For example, interest data record 110a may include first geographic location data representing a first geographic location, while interest data record 110b may include second geographic location data representing a second geographic location, where the first and second geographic location data differ from each other. The geographic location data contained within a particular interest data record may represent a geographic location of a geographic site represented by the particular interest data record. For example, consider an interest data record containing or otherwise representing an image of the Eiffel Tower. Such an interest data record may contain geographic location data representing a geographic location of the Eiffel Tower.

Geographic location data may represent geographic locations in any form, such as in the form of Global Positioning System (GPS) coordinates, latitude and longitude, or address (e.g., any one or more of street address, city, state, postal code, and country).

Geographic location data may be obtained from any source(s), such as one or more of the following: devices equipped with GPS modules, metadata within images and/or other data, and manual user input (such as a postal code input by a user into a text field). For example, the person 102b may use a smartphone equipped with a camera and a GPS module to capture an image of the Eiffel Tower and to embed GPS coordinates, representing the location of the smartphone at the time the image was captured, within the image. The smartphone may then provide interest input data 104d, containing the image (including the embedded GPS coordinates), to the interest input module 106, which may then generate interest data record 110c based on the interest input data 104d. The resulting interest data record 110c may contain the image (including the embedded GPS coordinates) and/or data derived therefrom.

Geographic location data may, but need not, be generated and/or associated with an interest data record at the time the interest data record is created. Such geographic location data may be generated and/or associated with the interest data record after the interest data record is created. Furthermore, the geographic location data associated with a particular interest data record may be derived from input provided by a user other than the user who provided the interest input that was the source of the interest data record itself. For example, person 102b may provide an image of the Eiffel Tower in interest input 104d, thereby causing the creation of interest data record 110c containing the image of the Eiffel Tower, but not containing any geographic location data. Person 102c may then provide interest input 104e containing geographic location data (such as a postal code or street address), in response to which the interest input reception module 106 may store the newly-obtained geographic location data provided by user 130 in association with the existing interest data record 110c (e.g., Eiffel Tower image).

The system 100 also includes an interest data aggregator 112. The interest data aggregator 112 may receive some or all of the interest data records 110a-e and/or data derived therefrom. For example, the interest data aggregator 112 may receive interest data records from applications such as Facebook, Flickr, Tumblr, and Instagram. Each such interest data record may include any one or more of the following:
  image, text, audio, and/or video data;
  geographic location data; and
  preference data.

For example, the interest data aggregator 112 may receive (e.g., by pulling) a plurality of images and associated geographic location data from Panoramio, and "like" data associated with the locations of those images.

The interest data aggregator 112 may generate aggregated interest data 114 based on the interest data records 110a-e. Such aggregated interest data 114 may, for example, include copies of some or all of the interest data records 110a-e and/or data derived therefrom. For example, the aggregated interest data 114 may include photos of geographic sites, and associated geographic location data and preference data, obtained from a plurality of Internet applications, such as Facebook, Flickr, Tumblr, and Instagram.

The system 100 also includes a heat map generator 116, which generates heat map data 118 representing a "heat map" of some or all of the aggregated interest data 114 (FIG. 2, operation 204). In general, if each of the interest data records in the aggregated interest data 114 is treated as a point located at that record's corresponding geographic location, then the heat map data 118 represents a plurality of densities of the resulting geographic locations. According to the "heat map" metaphor used herein, a geographic area which contains a relatively high density of geographic locations is considered to have a relatively high "temperature," wherein a geographic area which contains a relatively low density of geographic locations is considered to have a relatively low "temperature."

As will be described in more detail below, the heat map 118 may be generated based on publicly available data, such as photos posted by users to online photo sites. The heat map 118 may, therefore, be generated based on data provided by people who do not intentionally provide data for use in generating the heat map 118. Instead, the heat map 118 may be generated based on data provided by people who post photos, videos, comments, and other data for purposes such as sharing their travel experiences with friends. The system 100 of FIG. 1A may then obtain such data and interpret it as representing votes for the locations represented by such data. The system 100 of FIG. 1A may then generate the heat map 118 based on such votes. As will be described in more detail below in connection with the system 150 of FIG. 1B, the system 150 may then generate, for a particular user of the system 150, a route from that user's starting location to that user's ending location. In this way, embodiments of the present invention may use publicly available data received from a plurality of people to assist in the generation of a visually interesting route for a user of the system 150, whether or not that user provided any of the publicly available data that was used to generate the route.

The heat map generator 116 may generate the heat map data 118 in any of a variety of ways. For example, the heat map generator 116 may include or otherwise have access to map data 142 representing a plurality of geographic locations. The map data 142 may, for example, represent one or more neighborhoods, towns, cities, states, regions, countries, or continents. The heat map generator 116 may segment the map represented by the map data 142 into a network of plurality of cells having any shape(s), such as any polygonal (e.g., square, rectangular, or hexagonal) shape (s). The cells in the network may all share the same shape or have differing shapes. Each of the cells may envelope a geographic area of any size, such as 10, 100, or 1000 square meters.

Any particular cell in the network may "include" zero, one, or more interest data records in the aggregated interest data 114. A particular cell in the network is considered to "include" a particular interest data record if the geographic location data contained within, or otherwise associated with, the particular interest data record represents a geographic location within the geographic area enveloped by the cell.

The heat map generator 116 counts, for each of one or more of the cells C in the network, the number of interest data records included in cell C. The heat map generator 116 derives a temperature value associated with cell C from the number of interest data records included in cell C and stores, in the heat map data 118: (1) the temperature value associated with cell C; and (2) data representing an association between cell C and the temperature value associated with cell C.

The heat map generator 116 may derive the temperature value associated with a particular cell C in any of a variety of ways. For example, the heat map generator 116 may simply use the count of the number of interest data records included in cell C as the temperature value associated with cell C. As another example, the heat map generator 116 may weight the influence of interest data records included in cell C using preference data associated with those interest data records when generating the temperature value associate with cell C. For example, an interest data record in cell C having a high user preference (e.g., a relatively large number of Facebook "likes") may be weighted more heavily by the heat map generator 116 in the calculation of the temperature value associated with cell C than an interest data record in cell C having a low user preference (e.g., a relatively small number of Facebook "likes").

The heat map generator 116 may also generate and store in the heat map data 118, for each of the cells C in the network, a "center of gravity" of the cell C based on the interest data records included within the cell C. Such a center of gravity may be calculated using conventional techniques based on the geographic locations of the interest data records within the cell C, possibly weighted by the preference data associated with those interest data records. Embodiments of the present invention may treat a cell's center of gravity as the location of the cell for purposes of including the location of the cell as a starting point, ending point, or intermediate destination in a route.

Figure 3:
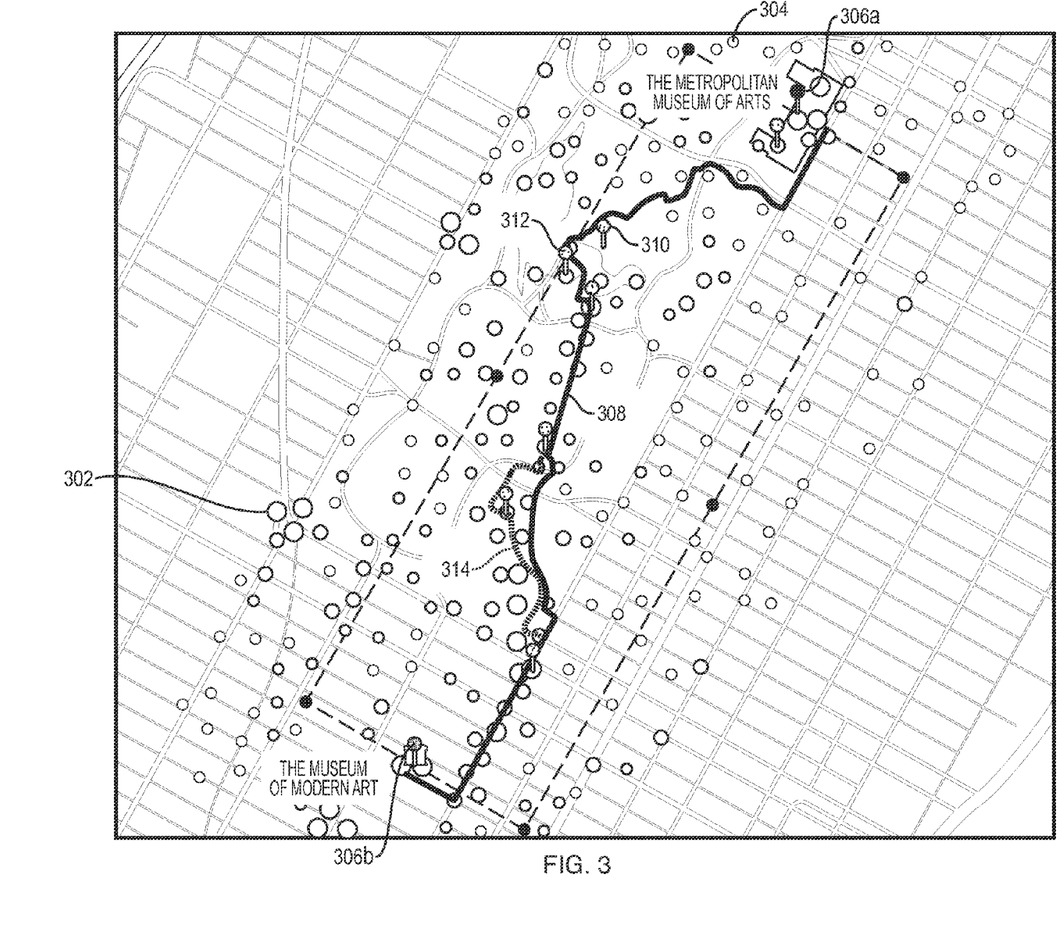
FIG. 3 is a diagram of a visual interest heat map according to one embodiment of the present invention.

Referring to FIG. 3, an illustration is shown of a heat map and a route generated using that heat map according to one embodiment of the present invention. The example in FIG. 3 illustrates a heat map in midtown New York, and a route 308 from the Metropolitan Museum of Art 306a to the Museum of Modern Art 306b. The heat map is represented visually in FIG. 3 by dots at various geographic locations. The size of each dot is a function of the temperature of the corresponding cell in the heat map. Larger dots have higher temperatures. For example, dot 302 is larger than dot 304, indicating that the cell represented by dot 302 has a higher temperature (e.g., higher density of publicly available photos) than the cell represented by dot 304. The route 308 will be described in more detail below in connection with FIG. 1B.

Figure 1B:
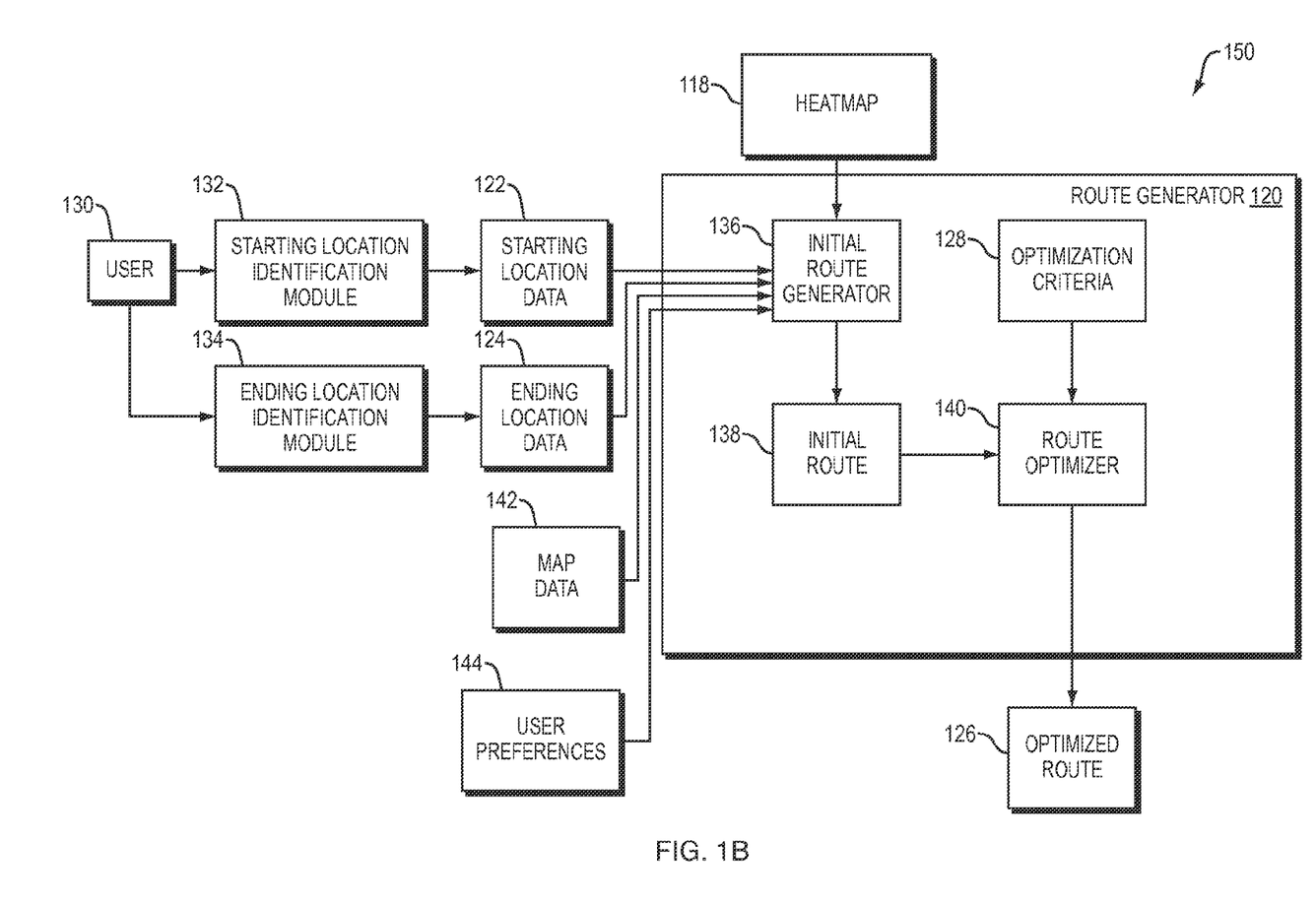
FIG. 1B is a dataflow diagram of a system for generating an interesting route from a starting location to an ending location according to one embodiment of the present invention.
Figure 2:
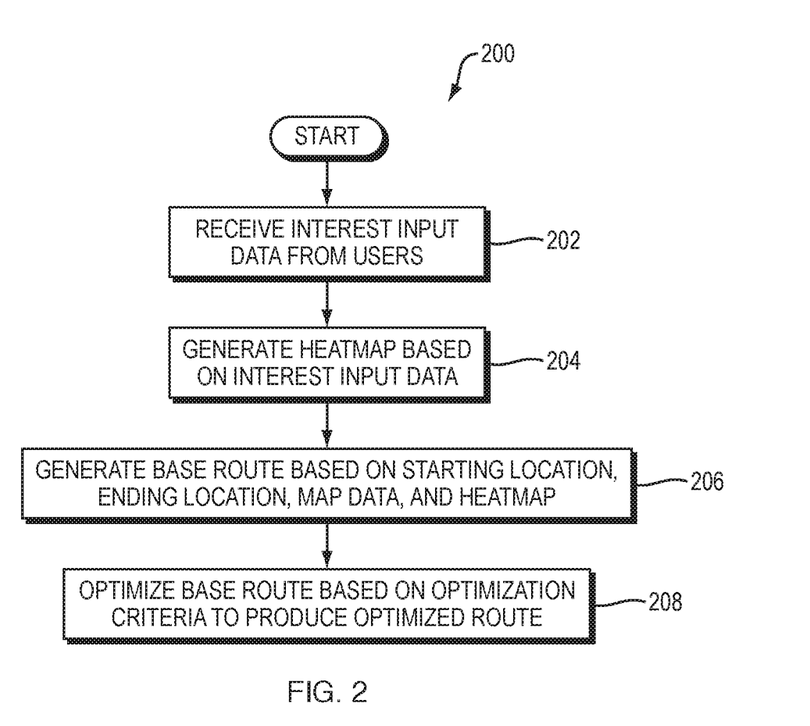
FIG. 2 is a flowchart of a method performed by the systems of FIGS. 1A-1B according to one embodiment of the present invention.

Referring to FIG. 1B, a system 150 is shown for generating a route 126 from a starting location to an ending location. The system 150 includes a route generator 120, which generates route data 126 representing a route from a starting location (represented by starting location data 122) to an ending location (represented by ending location data 124), and which includes one or more geographic locations of geographic sites represented by one or more of the interest data records in the aggregated interest data 114.

The route generator 120 may generate the route data 126 in any of a variety of ways, as in the following example. Assume, for purposes of example, that the route to be generated by the route generator 120 is intended to be traveled by a particular user 130, who may or may not be one of the people 102a-c who provided interest input data 104a-g to the system 100 of FIG. 1A. The route generator 120 includes or receives starting location data 122 representing a starting geographic location (also referred to merely as a "starting location") of the route to be generated. The route generator 120 may receive the starting location data 122 in any of a variety of ways. For example, a starting location identification module 132 may identify, generate, and/or otherwise provide starting location data 122 representing the starting location to the route generator 120. The starting location identification module 132 may, for example, identify the current location of the user 130 as the starting location and store the current location in the starting location data 122, such as by identifying the current location of the user 130 automatically (e.g., using a GPS module), or by receiving input representing the current location of the user 130 from the user 130 (e.g., in the form of text input representing a street address or postal code of the user's 130 current location).

The starting location data 122 may, but need not, represent the current location of the user 130. Alternatively, for example, the starting location data 122 may represent a past location of the user 130, a stored location associated with the user 130 (such as the location of the user's home or place of work), or an intended future location of the user 130 (such as a location obtained from a stored future calendar appointment associated with the user 130). The route generator 120 may retrieve such non-current locations automatically (e.g., by retrieving them from a calendar or database) or receive such non-current locations from the user 130 manually (e.g., by the user 130 manually providing input representing a street address or location name (e.g., "Eiffel Tower")).

The route generator 120 includes or receives ending location data 124 representing an ending geographic location (also referred to merely as an "ending location") of the route to be generated. The route generator 120 may receive the ending location data 124 in any of a variety of ways. For example, an ending location identification module 134 may identify, generate, and/or otherwise provide ending location data 124 representing the ending location to the route generator 120. The ending location identification module 134 may, for example, identify the current location of the user 130 as the ending location and store the current location in the ending location data 124, such as by identifying the current location of the user 130 automatically (e.g., using a GPS module), or by receiving input representing the current location of the user 130 from the user 130 (e.g., in the form of text input representing a street address or postal code of the user's 130 current location). It may be useful to identify the user 130's current location as the ending location if the user 130 desires to travel in a loop and arrive back at the user 130's current location at the end of the route.

The ending location data 124 may, but need not, represent the current location of the user 130. Alternatively, for example, the ending location data 124 may represent a past location of the user 130, a stored location associated with the user 130 (such as the location of the user's home or place of work), or an intended future location of the user 130 (such as a location obtained from a stored future calendar appointment associated with the user 130). The route generator 120 may retrieve such non-current locations automatically (e.g., by retrieving them from a calendar or database) or receive such non-current locations from the user 130 manually (e.g., by the user 130 manually providing input representing a street address or location name (e.g., "Eiffel Tower")).

The system 150 may also include user preference data 144. The user preference data 144 may, for example, include data representing the user 130's sightseeing preferences. For example, the user preference data 144 may include data representing one or more categories of destinations that the user 130 prefers to visit along a route. Examples of such categories include restaurants, landmarks, stores, historic sites, parks, and national monuments. The system 150 may obtain the user preference data 144 from any source. For example, the user 130 may provide manual input representing the user preference data 144 to the system 150. As another example, the system 150 may generate some or all of the user preference data based on data obtained from one or more social networking accounts of the user 130. As another example, the system 150 may learn some or all of the user preference data 144 based on interest input data received from the user 130, such as photos posted by the user 130 to public sites. For example, if the system 150 observes that the user 130 frequently posts photos of stores from various cities, the system 150 may conclude that the user 130 has a preference for visiting stores and, in response to such an observation, the system 150 may add the category of "store" to the user 130's preference data.

The route generator 120 includes an initial route generator 136 which receives the starting location data 122, ending location data 124, and map data 142 as inputs, and which generates initial route data 138, representing an initial route, as output, based on one or more of the starting location data 122, the ending location data 124, the map data 142, and the user preference data 144 (FIG. 2, operation 206).

For ease of explanation, the initial route data 138 may also be referred to herein as the "initial route," even though the initial route data 138 is not a route, but rather data representing a route. Similarly, the optimized route data 126 may be referred to herein as an "optimized route" for ease of explanation.

In general, the initial route 138 is intended to include as many interesting cells as possible (where "interesting cells" refer to relatively high-temperature cells in the heat map represented by the heat map data 118) while satisfying the optimization criteria 128, e.g., while deviating from the maximally efficient route between the starting location and the ending location by no greater than a predetermined maximum time and/or distance. The initial route 138 is a polyline (i.e., a continuous line built from segments which connect the starting location, all waypoints, and the ending location). Each segment in the polyline is a straight line connecting two consecutive points in the route.

The initial route generator 136 may generate the initial route 138 in any of a variety of ways. For example, the initial route generator 136 begins by generating a preliminary initial route (not shown) which consists of a single leg (line segment) in the form of a straight line from the starting location represented by the starting location data 122 to the ending location represented by the ending location data 124.

The initial route generator 136 may then perform an iterative process to produce the initial route 138 from the preliminary initial route. Each of the iterations in the iterative process includes the following:

- The initial route generator 136 generates data representing an "exclusion zone" around the starting location, the ending location, and any waypoint found in a previous destination (see below). Each exclusion zone may, for example, be a circle with a radius of R % of the straight-line distance between the starting location and the ending location, where R may have any value. The value of R may be contained within the optimization criteria 128 and may be user-configurable.
- The initial route generator 136 identifies the longest leg of the existing initial route 138.
- The initial route generator 136 defines a search area for the next waypoint as a parallelepiped extending a maximum of X % of the length of the identified longest leg on either side of the identified longest leg along its entire length, where X may have any value. The value of X may be contained within the optimization criteria 128 and may be user-configurable.
- The initial route generator 136 excludes all previously-identified exclusion zones from the search area.
- The initial route generator 136 may perform one of the following two actions:
  - Identify, based on the heat map data 118, the cell in the heat map having the highest (maximum) temperature of all cells within the search area. The initial route generator 136 selects the identified cell as the next waypoint. As described above, the location of the cell, for purposes of using the cell as a waypoint, may be the center of gravity of the cell.
  - Identify, within the search area, a location satisfying some or all of the user preferences 144. For example, if the user preferences 144 indicate that the user 130 has a preference for visiting stores, then the initial route generator 136 may attempt to identify a store within the search area. If the initial route generator 136 finds such a store, the initial route generator 136 may select that store (or the cell containing the store) as the next waypoint.

The initial route generator 136 splits the currently-identified longest leg into two straight-line segments (legs), where the first of the two segments connects the starting location of the leg to the waypoint, and where the second of the two segments connects the waypoint to the ending location of the leg.

The initial route generator 136 repeats the iterations above until N waypoints have been found, where N may be any number. The value of N may be contained within the optimization criteria 128 and may be user-configurable. The result of this process is the creation of the initial route represented by the initial route data 138.

The purpose and operation of the initial route generator 136 is to generate an initial route in which high-temperature points are spread out across the route. The resulting initial route 138 is intended to provide maximum scenic value to the user 130 by spreading visually interesting points along the route 138, starting with the highest temperature point, and spreading other points out along the initial route 138.

The route generator 120 also includes a route optimizer 140, which receives as input the initial route data 138, the heat map data 118, and the optimization criteria data 128, and which generates as output the interest-optimized route 126 based on one or more of the initial route data 138, the heat map data 118, and the optimization criteria data 128 (FIG. 2, operation 208).

In general, the optimized route represented by the optimized route data 126 is intended to pass through the waypoints identified above and to extend the shortest possible route between the starting location and the ending location by not more than D % of the distance of the shortest possible route and/or T of the time required to travel the shortest possible route, where D and T may be any values. The values of D and T may be contained within the optimization criteria 128 and may be user-configurable.

The route optimizer 140 may generate the optimized route 126 from the initial route 138 in any of a variety of ways. For example, the route optimizer 140 may begin by calculating the shortest route (i.e., an optimal route or maximally efficient route) between the starting location and the ending location using a conventional routing engine. The shortest route may be calculated for any mode of travel, such as walking, bicycling, or driving.

The route optimizer 140 may then perform an iterative process to generate the optimized route 126, in which each of the iterations includes the following:

The route optimizer 140 generates a route (referred to below as the "current generated route") using the starting location, ending location, and all existing waypoints using the conventional routing engine mentioned above.

If the current generated route has either: (1) a total travel time (i.e., a travel time from the starting location to the ending location through all waypoints in the route) that is not greater than the total travel time of the shortest route by no more than T (where T may be an absolute amount of time or a percentage of the total amount of time required to travel the shortest route); and/or (2) a total distance (i.e., a distance from the starting location to the ending location through all waypoints in the route) which is not greater than the total distance of the shortest route by no more than D (where D may be an absolute distance or a percentage of the total distance of the shortest route), then terminate and use the current generated route as the final optimized route.

Otherwise, remove, from the current generated route, the waypoint with the largest distance ratio. The distance ratio of a waypoint W is calculated as the ratio of: (1) the sum of the lengths of the two legs connected to waypoint W; and (2) the straight-line distance between the waypoint immediately preceding waypoint W and the waypoint immediately following waypoint W.

The route optimizer 140 repeats the iterations above until the process terminates as described above. The currently-generated route is then used as the optimized route 126.

The system 100 may then display the optimized route 126 to the user 130 in any of a variety of ways. For example, any conventional map rendering engine may be used to render the optimized route 126 to the user 130. "Hot" areas (e.g., areas having relatively high temperatures) may be emphasized in the resulting rendering, such as by displaying them in different colors than other areas, or by displaying the route segments within such areas with thicker lines than route segments in other areas.

Referring again to FIG. 3, an illustration is shown of an optimized route 308 from a starting location 306a (the Metropolitan Museum of Art) to an ending location 306b (the Museum of Modern Art) in New York City. The optimized route 308 illustrated in FIG. 3 is an example of the optimized route 126 generated by the system 150 of FIG. 1B. As can be seen from FIG. 3, the optimized route 308 differs from the shortest possible route from the starting point 306a to the ending point 306b. For example, it can be seen visually that the shortest walking route from the starting location 306a to the ending location 306b would likely traverse a straight line down Fifth Avenue from $82^{nd}$ Street down to $53^{rd}$ Street and then turn right onto $53^{rd}$ Street. Yet it can be seen visually that the optimized route 126 generated by the route generator 120 deviates from such a shortest walking route to include various visually interesting locations within Central Park before returning to Fifth Avenue after exiting Central Park.

Pins 310 and 312 are examples of waypoints generated by the initial route generator 136, and then provided to Google Maps routing engine to generate the initial route 138. Route 314 is the resulting initial route. As can be seen, the optimized route 312 differs from the initial route 314 in this example.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Printers suitable for use with various embodiments of the present invention typically include a print engine and a printer controller. The printer controller receives print data from a host computer and generates page information. The printer controller transmits the page information to the print engine to be printed. The print engine performs the physical printing of the image specified by the page information on an output medium.

What is claimed is:

1. A method performed by at least one computer processor executing computer program instructions stored on at least one non-transitory computer-readable medium, the method comprising:
   (1) receiving a plurality of interest input data, wherein the plurality of interest input data includes: (A) a plurality of geographic location data representing geographic locations of a plurality of geographic sites, wherein each of the geographic locations is a geographic location of a corresponding one of the plurality of geographic sites; and (B) a plurality of geographic site data representing the plurality of geographic sites, the plurality of geographic site data comprising a plurality of images of the plurality of geographic sites;
   (2) generating, based on the plurality of geographic location data, heat map data containing a plurality of cells representing a plurality of densities of the geographic locations in a plurality of geographic areas;
   (3) generating, based on the heat map data, initial route data representing an initial route from a starting location to an ending location, wherein the initial route includes a plurality of intermediate locations selected from the geographic locations of the plurality of geographic sites, comprising:
      (3)(a) obtaining the starting location from a Global Positioning System (GPS) module of a device, the device comprising one of a digital camera, a smartphone, a tablet computer, a desktop computer, and a laptop computer; and
      (3)(b) obtaining the ending location from a user via input provided by the user to the device; and
   (4) modifying the initial route to produce a modified route, comprising:
      (4)(a) removing, from the initial route data, at least one of the plurality of intermediate locations based on at least one optimization criterion.

2. The method of claim 1, wherein the plurality of geographic location data comprises geolocation metadata within the plurality of images.

3. The method of claim 1, wherein the plurality of geographic site data further comprises a plurality of textual descriptions of the plurality of geographic sites.

4. The method of claim 1, wherein the plurality of geographic site data comprises data representing a plurality of preferences, of a plurality of users, for the plurality of geographic sites.

5. The method of claim 1, wherein (3) further comprises:
   (3)(c) selecting, as a waypoint, a location of a cell from the heat map having a maximum density within a particular geographic area; and
   (3)(d) including data representing the selected waypoint in the initial route data.

6. The method of claim 1, wherein (3) comprises:
   (3)(c) selecting, as a waypoint, a location of a cell from the heat map containing a geographic site satisfying a preference of a user; and
   (3)(d) including data representing the selected waypoint in the initial route data.

7. The method of claim 1, wherein (4)(a) comprises:
   (4)(a)(i) determining that a total distance of the initial route is greater than a total distance of an optimal route from the starting location to the ending location by more than a maximum distance; and
   (4)(a)(ii) removing one of the plurality of intermediate locations in response to the determination of (4)(a)(i).

8. The method of claim 7, wherein the maximum distance comprises an absolute distance.

9. The method of claim 7, wherein the maximum distance comprises a percentage of the total distance of the optimal route.

10. The method of claim 1, wherein (4)(a) comprises:
    (4)(a)(i) determining that a total travel time of the initial route is greater than a total travel time of an optimal route from the starting location to the ending location by more than a maximum time; and (4)(a)(ii) removing one of the plurality of intermediate locations in response to the determination of (4)(a)(i).

11. The method of claim 10, wherein the maximum time comprises an absolute amount of time.

12. The method of claim 10, wherein the maximum time comprises a percentage of the total travel time of the optimal route.

13. A non-transitory computer-readable medium containing computer program instructions which, when executed by at least one computer processor, cause the at least one computer processor to perform a method, the method comprising:
- (1) receiving a plurality of interest input data, wherein the plurality of interest input data includes: (A) a plurality of geographic location data representing geographic locations of a plurality of geographic sites, wherein each of the geographic locations is a geographic location of a corresponding one of the plurality of geographic sites; and (B) a plurality of geographic site data representing the plurality of geographic sites, the plurality of geographic site data comprising a plurality of images of the plurality of geographic sites;
- (2) generating, based on the plurality of geographic location data, heat map data containing a plurality of cells representing a plurality of densities of the geographic locations in a plurality of geographic areas;
- (3) generating, based on the heat map data, initial route data representing an initial route from a starting location to an ending location, wherein the initial route includes a plurality of intermediate locations selected from the geographic locations of the plurality of geographic sites, comprising:
  - (3)(a) obtaining the starting location from a Global Positioning System (GPS) module of a device, the device comprising one of a digital camera, a smartphone, a tablet computer, a desktop computer, and a laptop computer; and
  - (3)(b) obtaining the ending location from a user via input provided by the user to the device; and
- (4) modifying the initial route to produce a modified route, comprising:
  - (4)(a) removing, from the initial route data, at least one of the plurality of intermediate locations based on at least one optimization criterion.

14. The non-transitory computer-readable medium of claim 13 wherein the plurality of geographic location data comprises geolocation metadata within the plurality of images.

15. The non-transitory computer-readable medium of claim 13, wherein the plurality of geographic site data further comprises a plurality of textual descriptions of the plurality of geographic sites.

16. The non-transitory computer-readable medium of claim 13, wherein the plurality of geographic site data comprises data representing a plurality of preferences, of a plurality of users, for the plurality of geographic sites.

17. The non-transitory computer-readable medium of claim 13, wherein (3) further comprises:
- (3)(c) selecting, as a waypoint, a location of a cell from the heat map having a maximum density within a particular geographic area; and
- (3)(d) including data representing the selected waypoint in the initial route data.

18. The non-transitory computer-readable medium of claim 13, wherein (3) further comprises:
- (3)(c) selecting, as a waypoint, a location of a cell from the heat map containing a geographic site satisfying a preference of a user; and
- (3)(d) including data representing the selected waypoint in the initial route data.

19. The non-transitory computer-readable medium of claim 13, wherein (4)(a) comprises:
- (4)(a)(i) determining that a total distance of the initial route is greater than a total distance of an optimal route from the starting location to the ending location by more than a maximum distance; and
- (4)(a)(ii) removing one of the plurality of intermediate locations in response to the determination of (4)(a)(i).

20. The non-transitory computer-readable medium of claim 19, wherein the maximum distance comprises an absolute distance.

21. The non-transitory computer-readable medium of claim 19, wherein the maximum distance comprises a percentage of the total distance of the optimal route.

22. The non-transitory computer-readable medium of claim 13, wherein (4)(a) comprises:
- (4)(a)(i) determining that a total travel time of the initial route is greater than a total travel time of an optimal route from the starting location to the ending location by more than a maximum time; and
- (4)(a)(ii) removing one of the plurality of intermediate locations in response to the determination of the means for determining.

23. The non-transitory computer-readable medium of claim 22, wherein the maximum time comprises an absolute amount of time.

24. The non-transitory computer-readable medium of claim 22, wherein the maximum time comprises a percentage of the total travel time of the optimal route.

* * * * *

UNITED STATES PATENT AND TRADEMARK OFFICE
CERTIFICATE OF CORRECTION

PATENT NO.       : 9,494,440 B2
APPLICATION NO.  : 14/319649
DATED            : November 15, 2016
INVENTOR(S)      : Sofinski et al.

Page 1 of 1

It is certified that error appears in the above-identified patent and that said Letters Patent is hereby corrected as shown below:

On the Title Page

On Page 2, in item (56), under "OTHER PUBLICATIONS", in Column 1, Line 15, delete "Availabie" and insert -- Available --, therefor.

On Page 2, in item (56), under "OTHER PUBLICATIONS", in Column 1, Line 39, delete "2016" and insert -- 2015 --, therefor.

Signed and Sealed this
Fourteenth Day of February, 2017

Michelle K. Lee
*Director of the United States Patent and Trademark Office*